(12) United States Patent
Clifford et al.

(10) Patent No.: US 12,112,626 B2
(45) Date of Patent: Oct. 8, 2024

(54) SIGNAL HEAD PROCESSING SYSTEM

(71) Applicant: Cavnue Technology, LLC, Arlington, VA (US)

(72) Inventors: David Hahn Clifford, Royal Oak, MI (US); Christopher Edward Hoover, Mountain View, CA (US)

(73) Assignee: Cavnue Technology, LLC, Arlington, VA (US)

( * ) Notice: Subject to any disclaimer, the term of this patent is extended or adjusted under 35 U.S.C. 154(b) by 55 days.

(21) Appl. No.: 17/867,151

(22) Filed: Jul. 18, 2022

(65) Prior Publication Data

US 2024/0021077 A1    Jan. 18, 2024

(51) Int. Cl.
*G08G 1/081* (2006.01)
*G06V 20/54* (2022.01)
*H04N 7/18* (2006.01)

(52) U.S. Cl.
CPC ............ *G08G 1/081* (2013.01); *G06V 20/54* (2022.01); *H04N 7/18* (2013.01)

(58) Field of Classification Search
None
See application file for complete search history.

(56) References Cited

U.S. PATENT DOCUMENTS

| | | | |
|---|---|---|---|
| 10,438,483 B2* | 10/2019 | Free | G08G 1/0104 |
| 2005/0200500 A1* | 9/2005 | Wing | G08G 1/09623 |
| | | | 348/148 |
| 2007/0222639 A1* | 9/2007 | Giles | G08G 1/0104 |
| | | | 701/119 |
| 2013/0100286 A1* | 4/2013 | Lao | G06V 20/54 |
| | | | 348/148 |
| 2020/0106942 A1* | 4/2020 | Jiang | G06T 5/50 |
| 2021/0318691 A1* | 10/2021 | Amini | G05D 1/0223 |

FOREIGN PATENT DOCUMENTS

| | | | | |
|---|---|---|---|---|
| CN | 211742276 U | * | 10/2020 | |
| CN | 113077630 A | * | 7/2021 | ......... G06K 9/00785 |
| CN | 113840765 A | * | 12/2021 | .......... B60W 30/146 |

OTHER PUBLICATIONS

Hu et al., "A multirange vehicle speed prediction with application to model predictive control-based integrated power and thermal management of connected hybrid electric vehicles," Journal of Dynamic Systems, Measurement, and Control, Jan. 2022, 144(011105):1-11.

* cited by examiner

Primary Examiner — Fekadeselassie Girma
(74) Attorney, Agent, or Firm — Fish & Richardson P.C.

(57) ABSTRACT

Systems and techniques are described for a signal head processing system. A signal head detector can be mounted by or attached to an existing control light signal head and provide data indicating the state, i.e., on, off, blinking, of each light of the control light signal head. The signal head detector can communicate with a nearby gateway device. The gateway device, in turn, communicates with a back end server, and the back end server performs near real-time control light pattern analysis and provides near real-time light status. Alternatively, the signal head detector can communication directly with the based end server. The server analysis can include frequency of light change per canister, intersection geometry and lane flows, per-intersection control lighting patterns, seasonal, e.g., time of day, lighting patterns, anomaly detection and failure detection.

16 Claims, 7 Drawing Sheets

SIGNAL HEAD PROCESSING SYSTEM

BACKGROUND

Intelligent traffic and roadway management systems monitor roadway conditions and traffic to determine traffic patterns, detect roadway anomalies and obstacles, and to determine other information that can be used to manage traffic routing and flow. Some intelligent traffic management systems require significant infrastructure build out, such as traffic sensor installation along roadways, lane control mechanisms, and the like.

Some extant traffic management equipment, or "legacy equipment," are not necessarily controlled by or interface with an intelligent traffic management system. For example, traffic signal heads may be operated according to predefined timing sequences and/or responsive to locally sensed conditions. In the case of the latter, vehicle sensors in the roadway may provide data that overrides a programmed traffic light sequence, or a pedestrian may activate a cross walk that interrupts a programmed traffic light sequence. Furthermore, the legacy equipment may be controlled by a proprietary protocol that may not be readily interfaced with an intelligence traffic management system that is being deployed.

The status of legacy equipment, however, can be of high utility for an intelligent traffic management system. For example, by collecting the status of traffic lights over time, an intelligent traffic management system can learn traffic patterns, detect anomalies, and the like. Designing systems that gather data by electronically interfacing with certain legacy equipment in the transportation field, however, can time consuming, and the resulting solutions can be expensive.

SUMMARY

The subject matter of this application describes a control light sensing system that, while not in electrical data communication with a traffic light signal head, can provide accurate information regarding the status of the traffic light signals of the traffic light signal head. The signal head detectors can be easily installed to monitor existing traffic light signal heads by passive sensing that does not require any data signal communications with the traffic light signal heads.

In general, another aspect of the subject matter described in this specification can be embodied in a control light sensing system that includes one or more signal head detectors. Each signal head detector includes a light sensing apparatus that separately senses each light of a plurality of lights of a traffic light signal head and for each light generates a first signal indicating an activated light, and a second signal indicating a deactivate light; a processor in data commination with the light sensing apparatus and that receives the signals generated by the light sensing apparatus; and a communication device in data communication with the processor and that generates and transmits a communication signal encoding the received signals generated by the light sensing apparatus. Each of the one or more signal head detectors is separate from the traffic light signal head and during operation is not in data communication with the traffic light signal head that the signal head detector is monitoring.

In some implementations, the control light sensing system also includes a gateway device in data communication with each of the one or more signal head detectors and that receives, from the communication device of each signal head detector, the communication signal and transmits the received communication signals to a server system.

In some implementations, the communication device transmits the communication signal to the gateway device over a first communication link; and the gateway device transmits the received communication signals to a server system over a second communication link. In other implementations, the communication device transmits the communication signal to the server system.

In some implementations, the light sensing apparatus light sensors that are each configured to be attached to a lens of a light of a traffic light signal head.

In some implementations, the processor includes a memory storing data that maps each light sensor to a respective light of the traffic light signal head, and the processor is configured to provide, to the communication device, data that indicates, for each signal generated by the light sensing apparatus, the light of the traffic light signal head to which the signal is mapped.

In some implementations, the communication signal generated by the communication device of the signal head detector further includes a unique identifier that uniquely identifies the signal head detector.

In some implementations, the processor includes a memory storing an identifier for each light sensor, and the processor is configured to provide, to the communication device, data that indicates, for each signal generated by the light sensing apparatus, the identifier of the light sensor that generated the signal; and the communication signal generated by the communication device of the signal head detector further includes a unique identifier that uniquely identifies the signal head detector.

In some implementations, the gateway device includes a memory storing data that, for each signal head detector of the one or more signal head detectors, maps the unique identifier of the signal head detector and each identifier of a light sensor to a respective light of the traffic light signal head identified by the unique identifier.

In some implementations, a server system is in data communication with the gateway device and one or more additional gateway devices. Each of the one or more additional gateway devices also receive communication signals from respective signal head detectors, and the server system: receives, from each gateway device, data that uniquely identifies each of the signal head detectors, and for each signal head detector, a status of each light of the traffic light signal head of the signal head detector; maps each traffic light signal head to the unique identifier in mapping data; and determines, based on the data received from the gateway devices over a time period, light pattern statistics of the traffic light signal heads for the time period.

In some implementations, determining, based on the data received from the gateway devices over the time period, light pattern statistics of the traffic light signal heads for the time period includes determining, based on the data received from the gateway devices over one or more seasonal time periods, seasonal light pattern statistics of the traffic light signal heads for each of the seasonal time periods.

In some implementations, the server system processes data received from the gateway devices over a most recent time period to determine most recent traffic light pattern statistics; selects, based on a current time, a seasonal light pattern statistic; compares the most recent light pattern statistics to the selected seasonal light pattern statistic; and in response to determining a statistical anomaly in the most recent light pattern statistics based on the comparison, generates a traffic pattern alert that indicates an abnormal traffic pattern occurring.

In another implementation, a control light sensing system includes one or more signal head detectors, each signal head detector including an image sensing apparatus that captures images of the lights of a traffic light signal head; a processor in data commination with the image sensing apparatus and that receives the images generated by the light sensing apparatus and processes the images and generates an output; and a communication device in data communication with the processor and that generates and transmits a communication signal encoding the output generated by the processor. Each of the one or more signal head detectors is separate from the traffic light signal head and during operation is not in data communication with the traffic light signal head that the signal head detector is monitoring.

In some implementations, the image sensing apparatus includes an image sensor for each light of the traffic light signal head that captures an image of the light; and the processor processes each image captured by the image sensors and determines, from the images, an activation status of each light depicted in each image and generates, as the output, data encoding the activation status of each light depicted in each image.

In some implementations, the image sensing apparatus is a single image sensor that captures an image of each of the lights of a traffic light signal head; and the processor processes the image captured by the single image sensor and determines, from the image, an activation status of each light depicted in each image and generates, as the output, data encoding the activation status of each light depicted in each image.

In some implementations, the control light sensing system includes a server system in data communication each of the one or more signal head detectors. The server system receives, from each signal head detector, data that uniquely identifies each of the signal head detectors, and for each signal head detector, the data encoding the activation status of each light depicted in each image; maps each traffic light signal head to the unique identifier in mapping data; and determines, based on the activation status of each light depicted in each image over a time period, light pattern statistics of the traffic light signal heads for the time period.

In some implementations, the processor compresses the images to generate as output compressed images.

In some implementations, the server system receives, from each signal head detector, data that uniquely identifies each of the signal head detectors, and for each signal head detector, the compressed images; maps each traffic light signal head to the unique identifier in mapping data; processes each compressed image to determine an activation status of each light depicted in each image; and determines, based on the activation status of each light depicted in each image over a time period, light pattern statistics of the traffic light signal heads for the time period.

The systems and methods described above may realize one or more of the following advantages. The system monitors traffic light states passively, meaning that a data communication connection with the traffic light signal head or traffic light system is not required. This reduces installation costs. Additionally, because the system is not invasive with respect to existing traffic light systems, there is no potential for the system to cause a malfunction in the traffic light signal head should the system malfunction. This eliminates potential safety hazards that could result by introducing another level of complexity into the traffic light signal head. Additionally, the signal head detectors are relatively small and lightweight, and thus do not interfere with structural load limits of mast arms, strain poles and unipoles, which further eases installation requirements.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The subject matter of this application describes a control light sensing system. The system includes a signal head detector that advantageously can be mounted by or attached to an existing traffic light signal head and provide data indicate the state, i.e., on, off, blinking, etc., of each light of the traffic light signal head. In some implementations, the signal head detector is a low power device that may be battery powered in combination with solar power and/or mechanical power generation.

In an implementation, a respective signal head detector is attached at a position to monitor each traffic light in an area, e.g., an intersection. Traffic lights may include traffic lights that primarily control traffic, and crosswalk signals then signal when traffic must yield to a crosswalk. In some implementations, each signal head detector can communicate with a nearby gateway device. For example, each intersection may have a gateway device to receive data from each signal head detector. The communication may be wired or wireless. In the case of the latter, the wireless communication may be of a personal area network type, e.g., Bluetooth®, Zibgee®, etc. Other radio communication protocols may also be used, however, and need not necessarily be low-power or limited range communication protocols.

The gateway device, in turn, communicates with a back end server, and the back end server performs near real-time traffic light pattern analysis and provides near real-time light status. Such analysis can include frequency of light change per canister, intersection geometry and lane flows, per-intersection traffic lighting patterns, seasonal, e.g., time of day, lighting patterns, anomaly detection and failure detection.

In other implementations, each signal head detector communicates directly with the back end server, and a gateway device is not required. For example, each respective signal head detector may communicate directly with the server by either a wired or a wireless connection. In the case of the former, each signal head detector may have a network interface card that connects directly to a wireless network. In the case of the latter, each signal head detector may have a cellular communication device. Other communication systems may also be used.

In an implementation, each signal head detector includes a light sensing apparatus, a processor, and a communication device. The light sensing apparatus separately senses each light of the multiple lights of a traffic light signal head and for each light generates a first signal indicating an activated light, and a second signal indicating a deactivate light. The processor is in data commination with the light sensing apparatus and receives the signals generated by the light sensing apparatus. The communication device, in turn, is in data communication with the processor, and generates and transmits a communication signal encoding the received signals generated by the light sensing apparatus. If the system includes a gateway device, then the gateway device in data communication with each of the one or more signal head detectors. The gateway device receives, from the communication device of each signal head detector, the communication signal and transmits the received communication signals to the server system.

In some implementations, the light sensing apparatus includes multiple light sensors that are each configured to be attached to a lens of a light of a traffic light signal head. The processor may be configured to associate each light sensor with a corresponding light. Alternatively, the gateway may be configured to associate each light sensor for each traffic light signal head with an associated light.

In an alternative implementation, the signal head detector includes an image sensing apparatus that captures images of the lights of a traffic light signal head. The image sensing apparatus may be a set of image sensors, each of which captures and image of a particular light on the traffic signal head, or, alternatively, may be a single image sensor that captures an image of all the lights on the traffic signal head. Thus, there may be a respective image sensor for each light of the traffic light signal head, or there may be a single image sensor that captures an image of all lights of a traffic light signal head. The images (or single image) are then processed to determine the status of each light in each image. The images may be processed on the processor of the signal head detector, or, alternatively, may be processed at the gateway. In another embodiment, the images may be compressed or down sampled and sent to the back end server for processing.

The system as described above provides an inexpensive and easy to install traffic light analysis system that does not require any interfacing or other data communication with an existing traffic lighting system. The signal head detectors may also be made of relatively inexpensive components and is relatively lightweight so that it can be mounted directly onto a traffic light signal head without adding any significantly load to the mounting system, which, in turn, further facilitates ease of installation.

While the examples below are described in the context of traffic lights, the subject matter of this application can be used for a variety of different control light systems, such as crosswalk lights, train crossing lights, metering lights, trolley lights, and so on.

These features and additional features are described in more detail in the claims that follow.

Figure 1A:
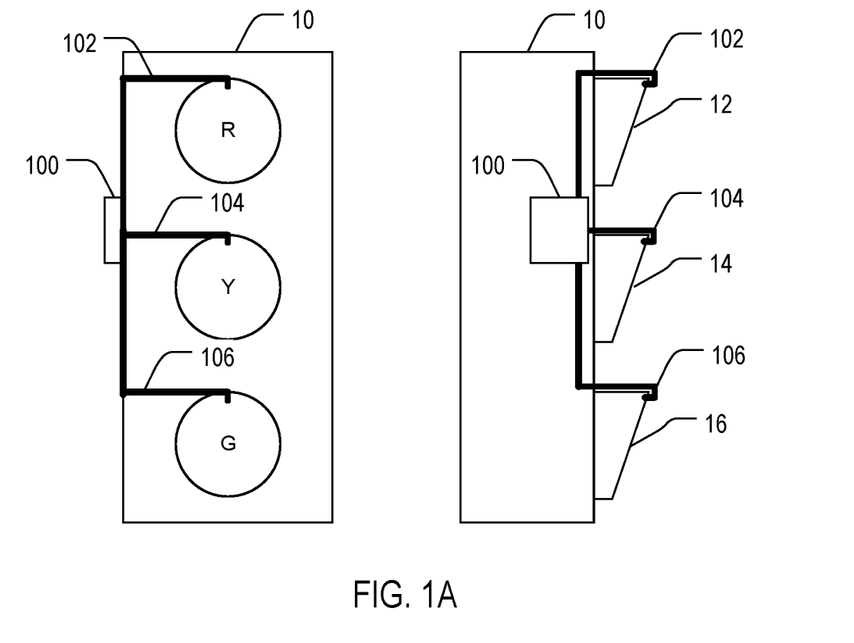
FIGS. 1A-1C are block diagrams that illustrate example implementations of signal head detectors that are used to detect the status of each light of a traffic light signal head.
Figure 1B:
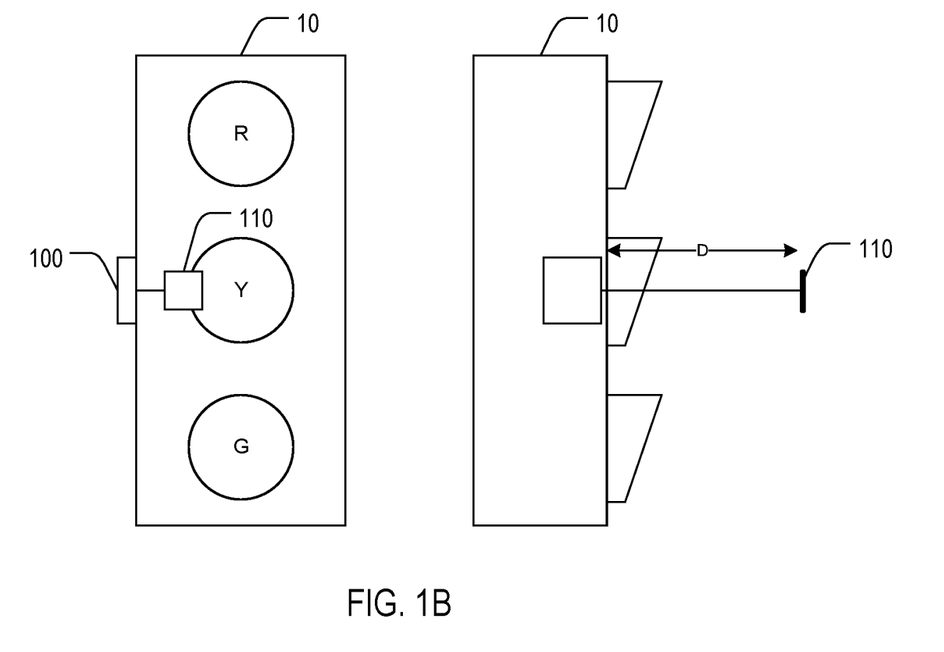
Figure 1C:
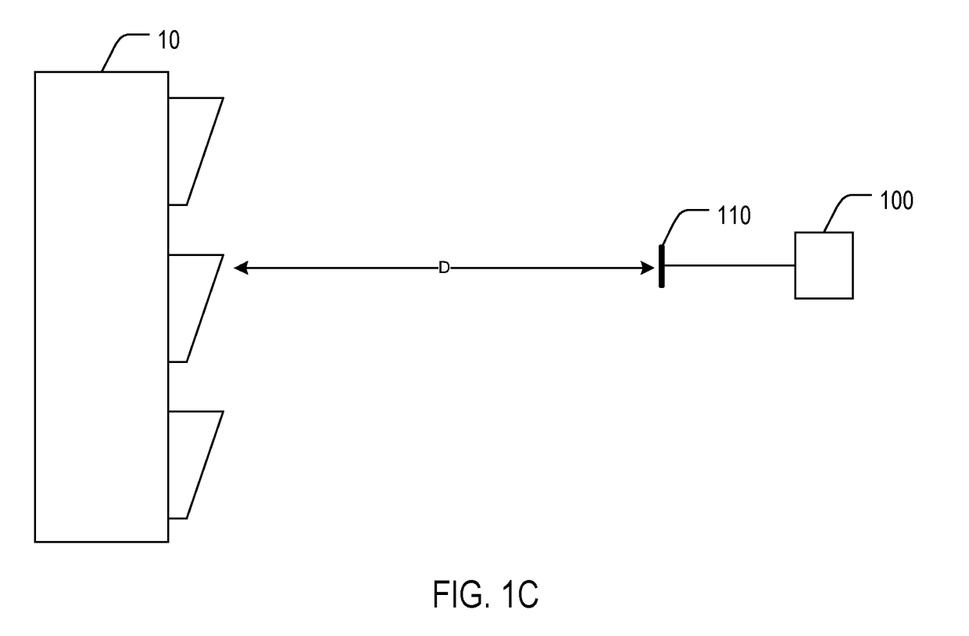

FIGS. 1A-1C are block diagrams that illustrate example implementations of signal head detectors 100 that are used to detect the status of each light of a traffic light signal head 10. In the examples below, a simple red, yellow and green traffic light signal head 10 is described. However, a more complex traffic light signal head with additional signals can also be monitored by providing additional sensors and ports to receive data from the sensors.

A first implementation is shown in FIG. 1A in which the red, green and yellow lights are respectively monitored by respective light sensing apparatus 102, 104 and 106. The light sensing apparatus in this implementation determines when a particular light it is positioned to monitor is illuminated. For example, as shown in FIG. 1A, each sensor 102, 104 and 106 of the signal head detector 100 is mounted on respective light covers 12, 14 and 16 to monitor the respective red, yellow and green lights. Alternatively, each sensor 102, 104 and 106 may be directly attached to a corresponding light lens, e.g., by an adhesive or mechanical mount, to monitor its respective single light. The detector 100 will receive a first signal with a particular light is on, and a second signal when a particular light is off. The detector may be programmed to associate a particular port with a particular light color during installation, or the ports may be predefined as red, yellow and green.

In some implementations, the light sensing apparatus may be a very simple photo sensing device, such as a photo diode. The photo diode may be attached in close proximity to the light, or, alternatively, may be located within the housing of the detector 100, and light couplers, such as fiber optic cables, may be used to capture light emitted from each light and provide the signal to the photo detectors. In still other implementations, filtering may be used to detect certain colors, e.g., a signal may be bandpass filtered for the red, green and yellow spectrum to detect whether a particular light is red, green or yellow. In still other implementations, the photo detectors may be configured to detect only certain colors, e.g., red, green or yellow. In variations of these implementations, the photo detectors may be grouped so that each grouping may be placed proximate to the light it is to monitor, and the resulting signal that is generated, e.g., a red, green or yellow detection signal, will be dependent on the light emitted from the traffic light.

In other implementations, each light sensing apparatus may be an image sensor, such as a charged couple device that generates image data for an image periodically, e.g., every N seconds, and the detector 100 processes each image to determine the status of each light. Other devices that can sense the status of a light can also be used.

FIG. 1B is another implementation in which a single image sensor 110 is used as a light sensing apparatus. In this implementation, the image sensor 110 is positioned at a distance D from the traffic light signal head 10 to ensure that the image generated by the image sensor captures each light lens of the traffic light signal head 10. For example, in FIG. 1B, the image sensor 110 is mounted on a short boom that extends from the traffic signal head 10 so that the image sensor is positioned at the distance D.

Other mounting techniques can also be used. For example, in FIG. 1C, the image sensor 110 and the detector 100 are not mounted on the traffic signal head 10 that the image sensor 110 monitors, but instead are mounted at another location (e.g., on a mast arm on an opposite side of an intersection, as illustrated in FIG. 3). In this implementation, the image sensor 110 may be configured to have a narrow field of view, e.g., by use of a lens, so that it captures the image of a traffic light signal head 10 that it is posited to monitor and omits the capture of other traffic light signal heads.

Figure 2:
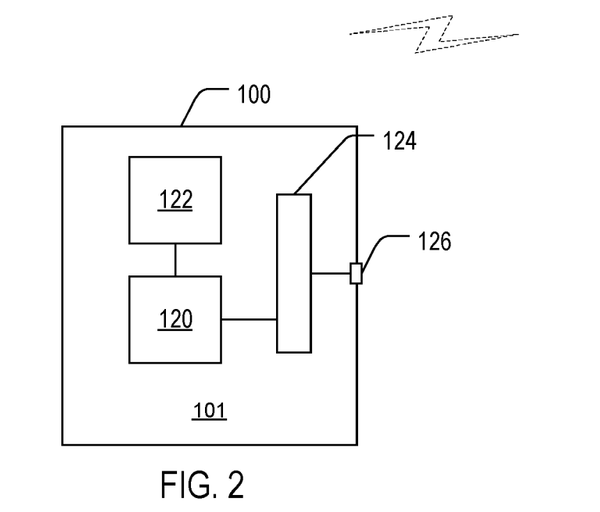
FIG. 2 is a block diagram of a signal head detector processing unit.

FIG. 2 is a block diagram of a signal head detector 100 processing unit 101. The processing unit 101 includes a processor 120, a memory 122, a communication device 124, and one or more ports 126. The one or more ports 126 are used to connect to the light sensors or image sensor, depending on the implementation used.

The communication device 124 is used to send and receive data from the processing unit 101. The communication device 124 is in data communication with the processor 120 and generates and transmits a communication signal encoding the received signals generated by the light sensors or image sensors. In the case of a gateway device being part of the system, the communication device 124 transmits communication signals to the gateway device over a first communication link, and the gateway device transmits the received communication signals to a server system over a second communication link. Alternatively, the communication device 124 may communicate directly with the server system.

The signal head detector processing unit 101 also includes a memory 122. In implementations that use a light sensor for each traffic light, the memory 122 stores data that maps each light sensor to a respective light of the traffic light signal head. The processor 120 uses this information to determine, for each signal generated by the light sensing apparatus, the light of the traffic light signal head to which the signal is mapped. The processor 120 can then provide this information to the communication device 124 for eventual transmission to the server.

The data stored in the memory 122 may also include a unique identifier that uniquely identifies the signal head detector that is monitored. This identifier is also provided to the server system to correlate light status information with each respective traffic light signal head 10.

The detector processing unit 101 may include other equipment, such as a Global Positioning System (GPS) module, a battery and solar charger that generates electricity from solar rays, and/or an electro-mechanical charger that generates electricity from motion.

In implementations that use an image sensor 110 to monitor traffic light status, the processor 120 is, in a first implementation, configured to receive and decode the image and determine the status of the light (or lights) captured by the image sensor. For example, if a respective image sensor is used to monitor each light in a traffic light signal head, then the processor 120 processes each image to determine the activation status of the corresponding light and generate corresponding output encoding the activation status of each light. Alternatively, in a second implementation in which a single image sensor 110 is used to monitor all the lights of a traffic light signal head, e.g., the implementations of FIGS. 1B or 1C, the processor 120 is configured to decode the image and determine the status of the lights captured by the image sensor. The processor 120 then generates, as the output, data encoding the activation status of each light depicted in each image.

In some implementations, a copy of the image(s), which may be down sampled, may be provided to the server with each set of data determined by the processor 120. In an alternate implementation, the processor 120 may down-sample or compress the images but otherwise not process the images and not determine the activation status of each light. Instead, the down sampled images are provided to the server for processing to determine the activation status of each light.

Figure 3A:
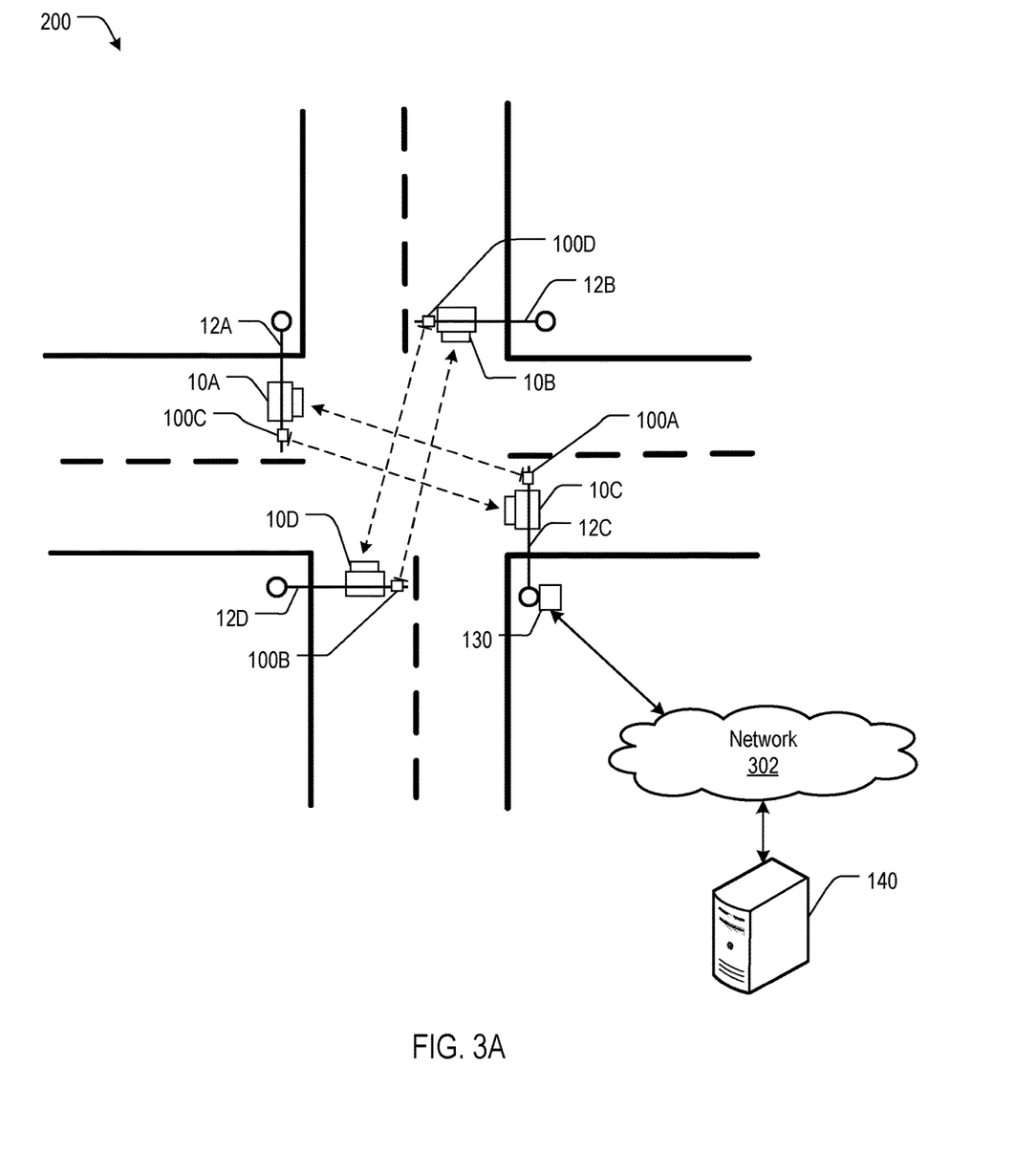
FIG. 3A is a diagram of an intersection that has be retrofitted with signal head detectors in communication with a gateway device and a server system.

FIG. 3A is a diagram of an intersection 200 that has be retrofitted with signal head detectors 100A-100D in communication with a gateway device 130 and a server system 140. In the example depicted, the signal head detectors 100A-100D are positioned to monitor signal head detectors 10A-10D respectively and as indicated by the dashed arrows, using an image sensor that captures an image of the monitored signal head. The detectors 100A-100D may then process the images to determine the light activation status, or, alternatively, may process the images for transmission to the server system 140 that will then determine the light status.

The gateway device 130 is a device that is in data communication with each of the signal head detectors 100 and that receives, from the communication device 124 of each signal head detector 100, a communication signal encoding data and transmits the received data to the server system 140 via a network 302. The network 302 may be the Internet, a wide area network, or a proprietary network.

As shown, there is a single gateway device 130 for an intersection of four lights. However, depending on the local network between the signal head detectors and the gateway device 130, a single gateway device 130 can serve multiple intersections.

Figure 3B:
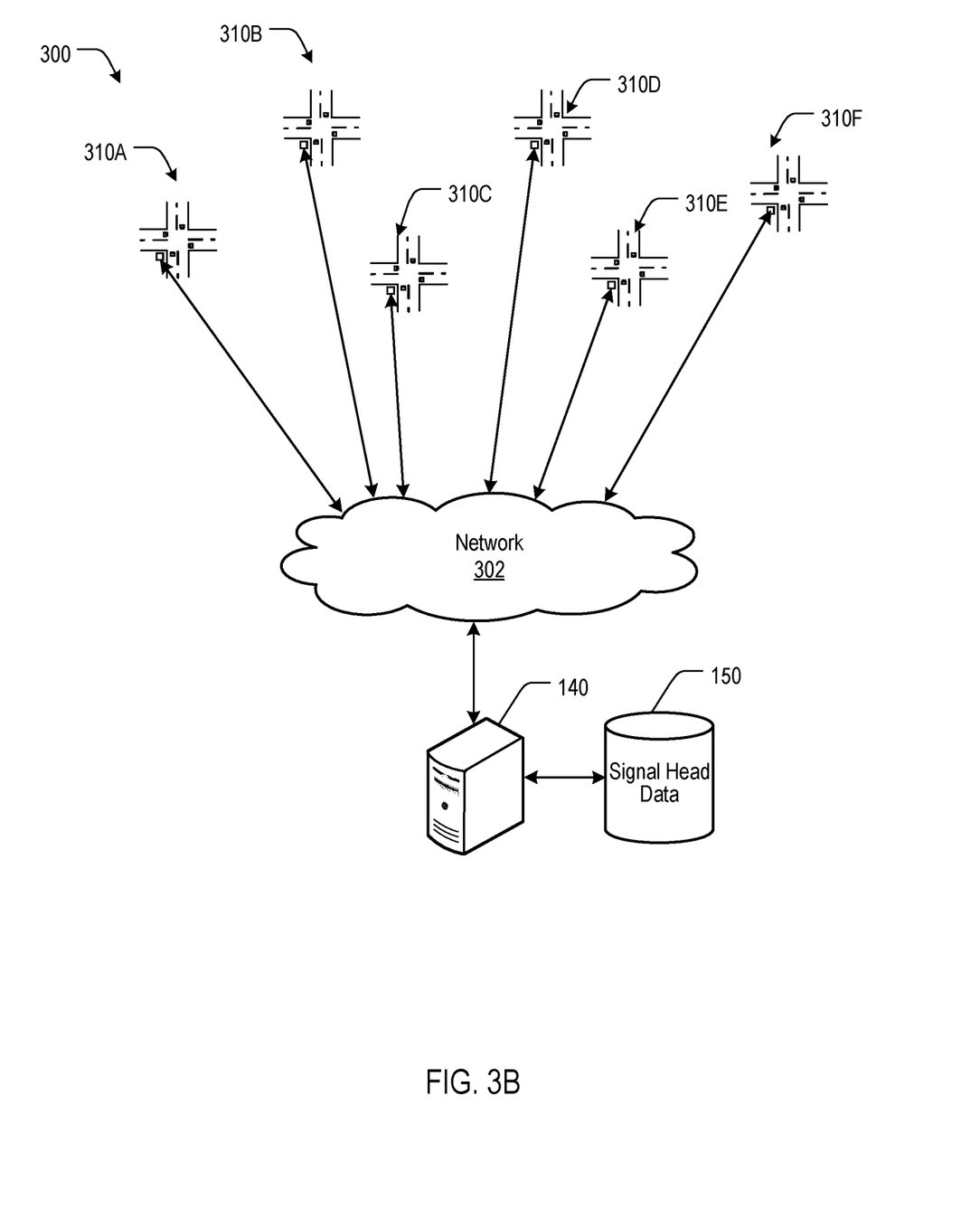
FIG. 3B is a system level diagram of a server system that receives data from gateways that each, in turn, receive data from one or more signal head detectors.

FIG. 3B is a system level diagram of the server system 140 that receives data from gateways 130 that each, in turn, receive data from one or more signal head detectors 100 at intersections 310A-310F. In operation, server system 140 receives data that uniquely identifies each of the signal head detectors and intersection combination with the light status information or image of the signal head lights. For example, intersection 310A may have a unique identifier, and each signal head may have an identifier paired with the intersection. Thus, for a particular signal head at a particular intersection, the data received for a reporting may be of the form:

{INT_UID; SH_ID; <DATA>; TIMESTAMP}

Where:

INT_UID is a unique identifier that identifies an intersection;

SH_ID is an identifier that identifies a monitored signal head (or signal head detector);

<DATA> is the light status information or an image of the light signal head (for processing by the server system); and TIMESTAMP is data indicating the date and time of the observation.

The server system 140 may store mapping data that maps the unique identifier of the intersection to a mapping/path algorithm for traffic processing. Alternatively, the intersection need not be identified; instead, each signal head detector may have a unique identifier SH UID that is stored in mapping data at the server system 140 that associates particular intersections and traffic signal heads with the signal head detector unique identifier. In these implementations, the data received by the server system 140 may be of the form:

{SH_UID; <DATA>; TIMESTAMP}

While unique identifiers are described, any identifier scheme that can result in a unique identifier for particular signal head detector data can be used. For example, a combination of an intersection identifier and signal head identifier can be used to generate a unique identifier, or the GPS location of the signal head detector can be used as a unique identifier.

The data are received for the intersections over a time period are stored as signal head data 150. The signal head data 150 may store data for extended periods of time, e.g., days, months or even years. The server system 140 then processes the signal head data 150 to determine light pattern statistics of the traffic light signal heads for the time period. These statistics may include, for seasonal time periods, traffic light signal head patterns for each of the seasonal time periods. Seasonality may indicate days of the week, or even periods of the day, e.g., there may be daily seasonality light sequences to accommodate traffic patterns, 8 PM-5:30 AM=Light traffic season; 5:30 AM-10:00 AM=morning rush season; 10:00 AM-3:30 PM=Afternoon season; 3:30 PM-8:00 PM=Afternoon/evening rush, etc.

The data are sent at a frequency sufficient to determine traffic patterns and light patterns. For example, the traffic lights may be observed and processed every N seconds. In some implementations, data may be batched at each signal head detector and sent for every M observations to reduce power consumption, e.g., a data batch of M observations may be sent every M*N seconds.

In implantation in which data are batched, a signal head detector 100 may have an error checking process that will send data upon detection of a traffic light signal head error or caution condition. For example, the signal head detector 100 may process the light activation data locally for a batch to determine if an error condition has occurred, e.g., when the signal head red light begins flashing for a predetermined amount of time, indicating an error has occurred. Upon such detection, the signal head detector 100 will immediately transmit the data to the gateway 130 for transmission to the server 140. In this way an intelligent traffic monitoring system will be quickly notified of an error condition for a particular light or intersection, thus avoiding a lag that may occur when waiting to collect the M observations.

Other errors and anomalies can also be detected by the server system 140. For example, statistical anomalies for traffic can be detected. The server system processes 140 data received from the gateway devices 130 over a most recent time period to determine most recent traffic light pattern statistics and selects, based on a current time, a seasonal light pattern statistic for that time. The server system then compares the most recent light pattern statistics to the selected seasonal light pattern statistic and determines whether an anomaly is observed. If an anomaly is determined, then in response to determining the statistical anomaly in the most recent light pattern statistics based on the comparison, the server system 140 generates a traffic pattern alert that indicates an abnormal traffic pattern occurring. For example, assume the daily seasonality is for very light traffic and a particular light sequence is expected. If, on the other hand, a light sequence for very heavy traffic is observed, then the server system 140 will generate an alert that the light patterns of the traffic signal heads at a particular intersection are not in accordance with the expected light patterns.

Other distributions of processing can also be implemented. For example, the gateway device 140 may store an intersection unique identifier, and the identifier of the signal head detector 100 may be paired with the identifier of the intersection by the gateway 140. The gateway device 140 may also map the signal head detectors 100 to particular signal heads in the intersection. In implementations in which the signal head detectors send images for processing, the gateway device 140 may process the images locally to determine the light status of each signal head, and then send the determined light status, signal head identifier, and intersection identifier to the server system 140.

In some implementations, the signal head detector 100 may buffer several sets of data to determine whether lights are blinking. For example, data for any prior five second period may be processed to determine if a yellow light is blinking, or a red light is blinking, etc.

The data encoding the light status information can be implemented by any appropriate data recordation scheme. For example, the data may be a bit map for each light, with the bit set to 1 for the light being on, and the bit set to 0 for the light being off. Other indicators can also be included, e.g., data fields can be included to indicate whether an error has been detected, such as all lights blinking, etc.

Figure 4:
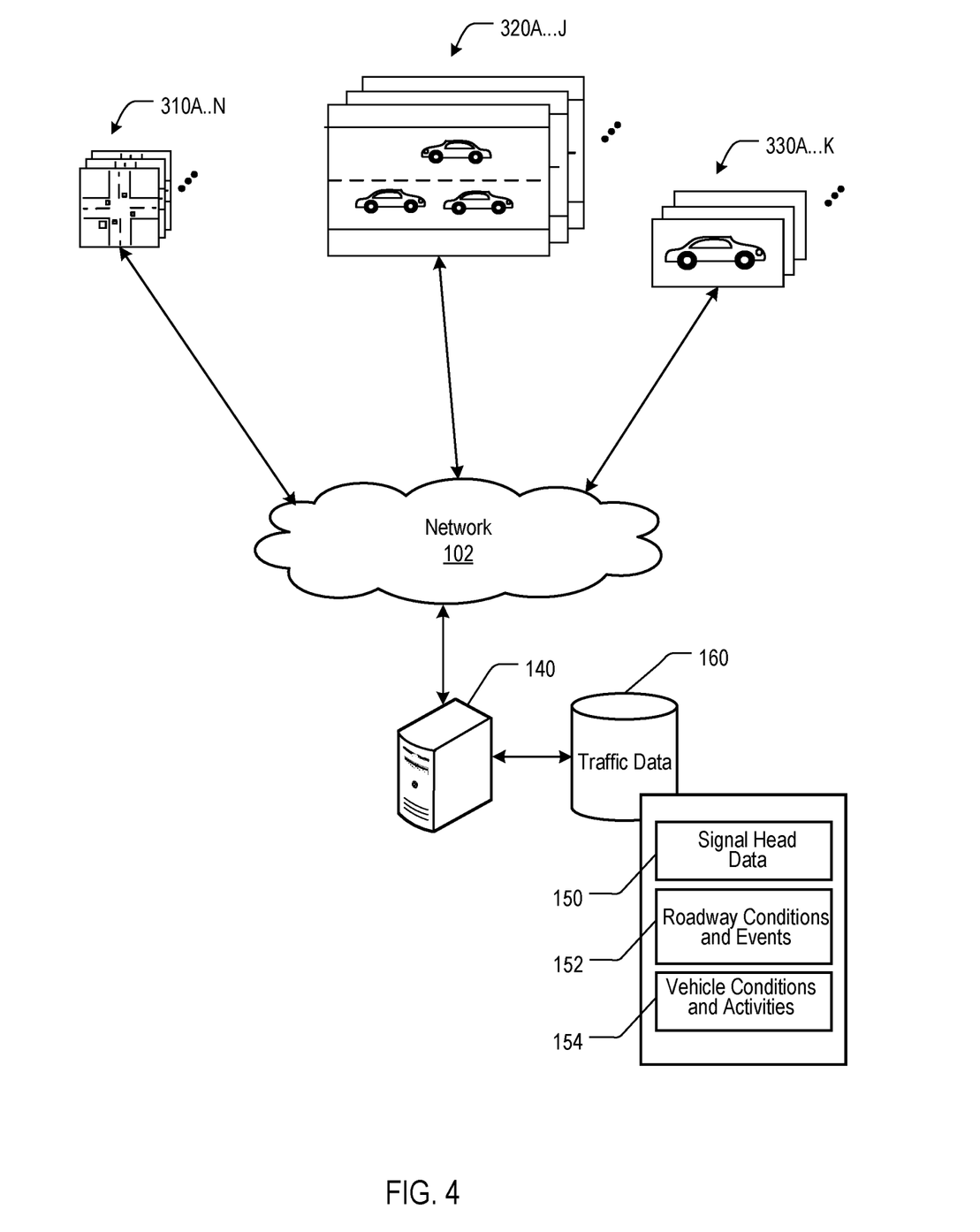
FIG. 4 a system level diagram of an intelligent traffic management system that implements the system of FIG. 3A.

The server system 140 may be used to provide information about traffic signal heads, or may be a component of a larger intelligent traffic monitoring system. For example, FIG. 4 is a system level diagram of an intelligent traffic management system that implements the system of FIG. 3A. The server system 140 includes a subsystem component that implements systems in accordance with FIGS. 1A-3B. Additionally, the sever system 140 receives data from instrumented roadways 320A-320J to determine roadway conditions and events 152, and receives data from smart vehicles 330A-330K to determine vehicle conditions and activities 154. Using all of this information, the server system 140 can provide routing assistance to individual vehicles, provide messages indicating traffic conditions on electronic road signs, and make other decisions and provide information that is individually or collectively determined from the signal head data 150, roadway events and conditions 152, and the vehicle conditions and activities 154.

Figure 5:
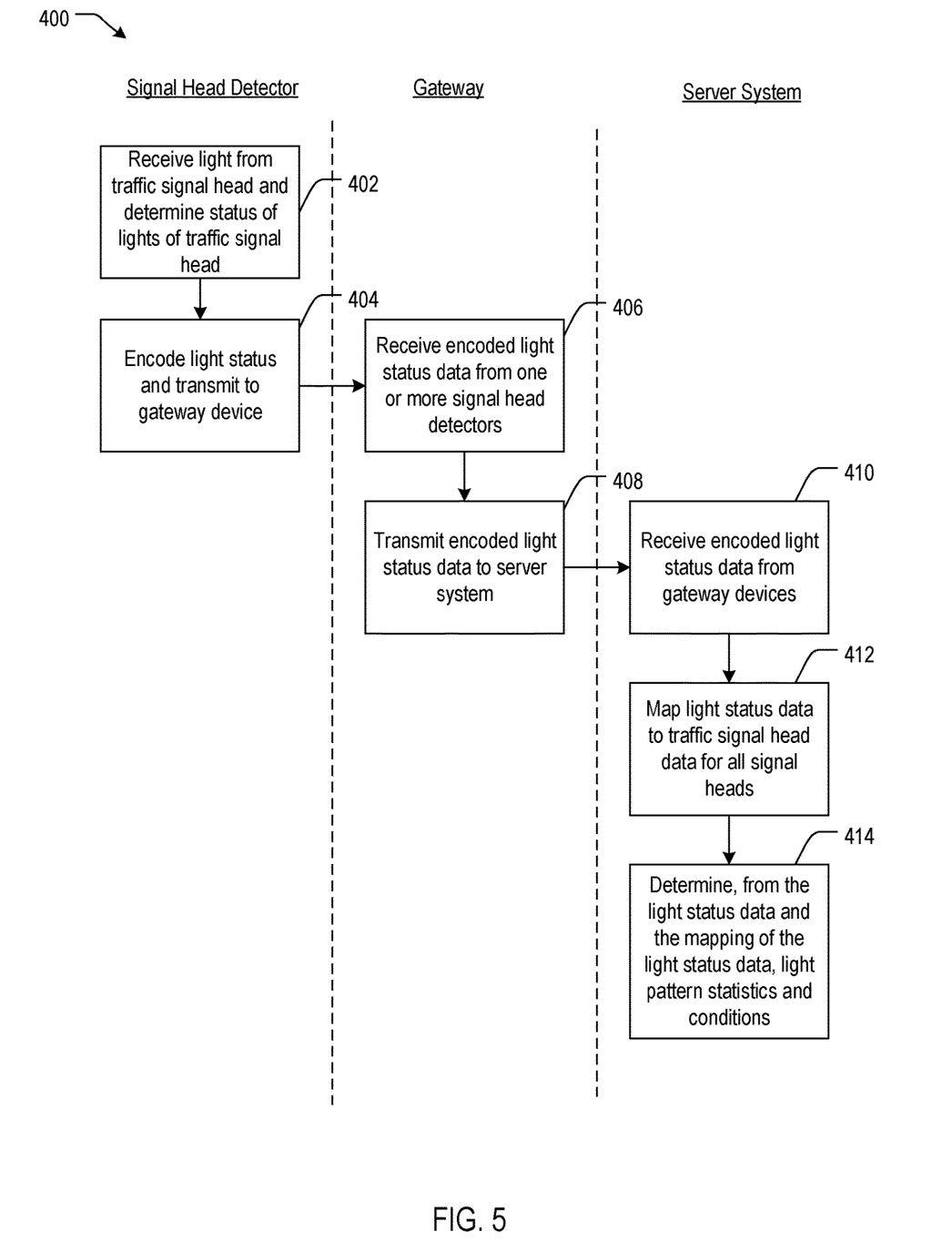
FIG. 5 is a flow diagram of an example process flow in a signal head processing system in which the signal head detector determines light status and transmits data regarding the light status to a server system for processing.

FIG. 5 is a flow diagram of an example process flow 400 in a signal head processing system in which the signal head detector determines light status and transmits data regarding the light status to a server system for processing. The system includes signal head detectors, a gateway, and a server system. However, the gateway device need not be included if the signal head detectors communication directly with the server system.

The signal head detector receives light from a traffic signal head and determine a status of lights of traffic signal head (402). For example, the signal head detector may use photo sensors to monitor each light, and depending on the photo sensor output, can determine the activation status of each light. Alternatively, the signal head detector may receive an image of each light of the signal head and determine the activation status of each light by processing the image to determine if the particular light is illuminated. In yet another implementation, the signal head detector may receive a single image of the signal head and determine, from the single image and using image processing techniques, the activation status of each light.

The signal head detector encodes light status and transmit to gateway device (404). For example, in each implementation above, the light activation status is encoded according to a data scheme. The data is then paired with a timestamp indicating the time of the observation, and an identifier of the signal head detector. The identifier may be unique to the signal head detector, or may be paired with a unique identifier for the intersection.

The gateway device receives encoded light status data from one or more signal head detectors (406). For example, as shown in FIG. 3A, the gateway device 130 receives data from four different signal head detectors in an intersection. That data may be further processed, depending on the implementation.

The gateway device transmits encoded light status data to server system (408). The gateway device may add its own identifier, depending on the identification scheme used.

The server system receives encoded light status data from gateway devices (410) and maps light status data to traffic signal head data for all signal heads (412). For example, the server system may map the data to assess traffic light status across a metropolitan area for path finding, alter generation, or any other processing of an intelligent traffic manager system.

The server system determines, from the light status data and the mapping of the light status data, light pattern statistics and conditions (414). For example, the server system processes data received from the gateway devices over a most recent time period to determine most recent traffic light pattern statistics and selects, based on a current time, a seasonal light pattern statistic for that time. The server system then compares the most recent light pattern statistics to the selected seasonal light pattern statistic and determines whether an anomaly is observed. If an anomaly is determined, then in response to determining the statistical anomaly in the most recent light pattern statistics based on the comparison, the server system generates a traffic pattern alert that indicates an abnormal traffic pattern occurring. Other errors or anomalous conditions that may not depend on seasonality can also be detected. Such conditions include four way stop conditions in which all red lights are flashing; a frozen intersection in which none of the signal heads are changing over time; dead (inoperable) signal heads, etc.

Figure 6:
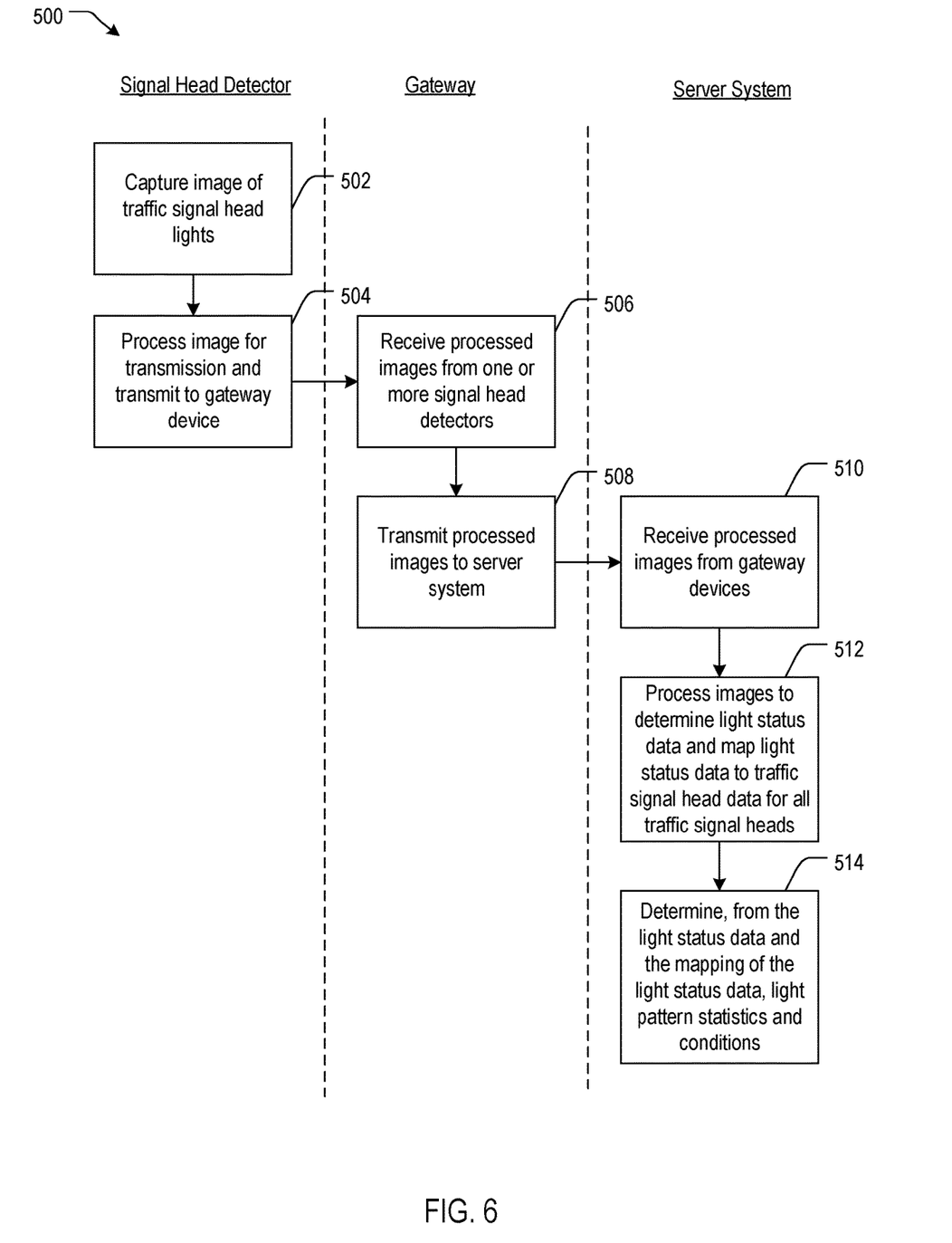
FIG. 6 is a flow diagram of an example process flow in a signal head processing system in which the signal head detector transmits images of traffic signal head lights to a server system for processing.

FIG. 6 is a flow diagram of an example process flow 500 in a signal head processing system in which the signal head detector transmits images of traffic signal head lights to a server system for processing. As with FIG. 5, the system includes signal head detectors, a gateway, and a server system. However, the gateway device need not be included if the signal head detectors communication directly with the server system. The process flow 500 differs from the process flow 400 in that the process flow 500 describes how images captured and provided to the server system 140 for processing.

The signal head detector captures image of traffic signal head lights (502). For example, the signal head detector may receive an image of each light of the signal head. Alternatively, the signal head detector may receive a single image of the signal head and determine.

The signal head detector processes image for transmission and transmit to gateway device (504). The signal head detector may down sample the image(s) or compress the image(s) for transmitting, and then pair the image(s) with a timestamp indicating the time of the observation, and an identifier of the signal head detector. The identifier may be unique to the signal head detector, or may be paired with a unique identifier for the intersection. The signal head detector may also label each image for an individual light of a signal head as either red, green or yellow (or other appropriate indicator, such as "left turn arrow," etc.). The labeling may be implemented by pre-associating each image sensor with the signal it is detecting, or, alternatively, by implementing an image processing routine that identifies particular images, such as arrow signals. Alternatively, the signal head detector may not adjust the image, and just process the image by adding the identifiers, labels, and timestamps.

The gateway device receives processed images from one or more signal head detectors (506). For example, as shown in FIG. 3A, the gateway device 130, for each observation of a traffic signal head, receives a single image from a signal head detectors in an intersection. That data may be further processed, depending on the implementation.

The gateway device transmits the processed images to the server system (508). The gateway device may add its own identifier, depending on the identification scheme used.

The server system receives processed images from gateway devices (510), and then processes the images to determine light status data and map light status data to traffic signal head data for all traffic signal heads (512). Using image processing technique as described above, the server systems determines the activation status of lights of a traffic signal head based on the captured images.

The server system determines, from the light status data and the mapping of the light status data, light pattern statistics and conditions (514). This process step is similar to the process step 414 of FIG. 5.

Various modification and other implementations of the systems and processes described above can also be used. For example, instead of a unique identifier scheme, or in additional to a unique identifier scheme, each signal head detector may append its data with global positioning data indicating the location of the signal head detector. If the signal head detector is mounted to the signal head, then the GPS data is indicative of the signal head location. Alternatively, if the signal head detector is mounted at a location away from the signal head it is monitoring (as in FIG. 3A) then an offset can be used to determine the location of the signal head. The offset may be programmed into the signal head, or, alternatively, may be stored in mapping data at either the gateway device or the server.

In some implementations, the system may be solar powered and isolated from a grid. A solar power system facilitates ease of installation.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A control light sensing system, comprising:
one or more signal head detectors, each signal head detector comprising:
a light sensing apparatus that separately senses each light of a plurality of lights of a control light signal head and for each light generates a first signal indicating an activated light, and a second signal indicating a deactivate light;
a processor in data communication with the light sensing apparatus and that receives the signals generated by the light sensing apparatus; and
a communication device in data communication with the processor and that generates and transmits a communication signal encoding the received signals generated by the light sensing apparatus;
wherein each of the one or more signal head detectors is separate from the control light signal head and is configured to be attached to the control light signal head the signal head detector is monitoring, and is not in data communication with the control light signal head that the signal head detector is monitoring;
wherein the light sensing apparatus comprises a plurality of light sensors that are each configured to be attached to the control light signal head to monitor light of a single light of the control light signal head;
wherein the processor includes a memory storing an identifier for each light sensor, and the processor is configured to provide, to the communication device, data that indicates, for each signal generated by the light sensing apparatus, the identifier of the light sensor that generated the signal; and
the communication signal generated by the communication device of the signal head detector further includes a unique identifier that uniquely identifies the signal head detector.

2. The control light sensing system of claim 1, further comprising a gateway device in data communication with each of the one or more signal head detectors and that receives, from the communication device of each signal head detector, the communication signal and transmits the received communication signals to a server system.

3. The control light sensing system of claim 2, wherein:
the communication device transmits the communication signal to the gateway device over a first communication link; and
the gateway device transmits the received communication signals to a server system over a second communication link.

4. The control light sensing system of claim 1, wherein the signal head detector includes a memory storing data that maps each light sensor to a respective light of the control light signal head, and the processor is configured to provide, to the communication device, data that indicates, for each signal generated by the light sensing apparatus, the light of the control light signal head to which the signal is mapped.

5. The control light sensing system of claim 4, wherein the communication signal generated by the communication device of the signal head detector further includes a unique identifier that uniquely identifies the signal head detector.

6. The control light sensing system of claim 2, wherein the gateway device includes a memory storing data that, for each signal head detector of the one or more signal head detectors, maps the unique identifier of the signal head detector and each identifier of a light sensor to a respective light of the control light signal head identified by the unique identifier.

7. The control light sensing system of claim 1, wherein the communication device transmits the communication signal to a server system.

8. The control light sensing system of claim 1, wherein the control light is a traffic light.

9. A control light sensing system, comprising:
one or more signal head detectors, each signal head detector comprising:
a light sensing apparatus that separately senses each light of a plurality of lights of a control light signal head and for each light generates a first signal indicating an activated light, and a second signal indicating a deactivate light;
a processor in data communication with the light sensing apparatus and that receives the signals generated by the light sensing apparatus; and
a communication device in data communication with the processor and that generates and transmits a communication signal encoding the received signals generated by the light sensing apparatus;
wherein each of the one or more signal head detectors is separate from the control light signal head and is configured to be attached to the control light signal head the signal head detector is monitoring, and is not in data communication with the control light signal head that the signal head detector is monitoring;
a gateway device and a server system, wherein:
the gateway devices is in data communication with each of the one or more signal head detectors and that receives, from the communication device of each signal head detector, the communication signal and transmits the received communication signals to a server system,
the server system in data communication with the gateway device and one or more additional gateway devices, wherein each of the one or more additional gateway devices also receive communication signals from respective signal head detectors, wherein the server system:
receives, from each gateway device, data that uniquely identifies each of the signal head detectors, and for each signal head detector, a status of each light of the control light signal head of the signal head detector;
maps each control light signal head to the unique identifier in mapping data; and
determines, based on the data received from the gateway devices over a time period, light pattern statistics of the control light signal heads for the time period.

10. The control light sensing system of claim 9, wherein determining, based on the data received from the gateway devices over the time period, light pattern statistics of the control light signal heads for the time period comprises determining, based on the data received from the gateway devices over one or more seasonal time periods, seasonal light pattern statistics of the control light signal heads for each of the seasonal time periods.

11. The control light sensing system of claim 10, wherein the server system:
processes data received from the gateway devices over a most recent time period to determine most recent control light pattern statistics;
selects, based on a current time, a seasonal light pattern statistic;
compares the most recent light pattern statistics to the selected seasonal light pattern statistic; and
in response to determining a statistical anomaly in the most recent light pattern statistics based on the comparison, generates a control pattern alert that indicates an abnormal control pattern occurring.

12. A control light sensing system, comprising:

one or more signal head detectors, each signal head detector comprising:
- an image sensing apparatus that captures images of one or more of the lights of a control light signal head;
- a processor in data communication with the image sensing apparatus and that receives the images generated by the light sensing apparatus and processes the images and generates an output; and
- a communication device in data communication with the processor and that generates and transmits a communication signal encoding the output generated by the processor;
- wherein each of the one or more signal head detectors is separate from the control light signal head and is configured to be attached to the control light signal head the signal head detector is monitoring, and is not in data communication with the control light signal head that the signal head detector is monitoring;
- wherein:
  - the image sensing apparatus comprises a single image sensor that captures an image of each of the lights of a control light signal head; and
  - the processor processes the image captured by the single image sensor and determines, from the image, an activation status of each light depicted in each image and generates, as the output, data encoding the activation status of each light depicted in each image; and further comprising a server system in data communication each of the one or more signal head detectors, wherein the server system:
- receives, from each signal head detector, data that uniquely identifies each of the signal head detectors, and for each signal head detector, the data encoding the activation status of each light depicted in each image;
- maps each control light signal head to the unique identifier in mapping data; and
- determines, based on the activation status of each light depicted in each image over a time period, light pattern statistics of the control light signal heads for the time period.

13. The control light sensing system of claim 12, wherein:
the image sensing apparatus comprises an image sensor for each light of the control light signal head that captures an image of the light; and
the processor processes each image captured by the image sensors and determines, from the images, an activation status of each light depicted in each image and generates, as the output, data encoding the activation status of each light depicted in each image.

14. The control light sensing system of claim 12, wherein the processor compresses the images to generate as output compressed images.

15. A control light sensing system, comprising:
one or more signal head detectors, each signal head detector comprising:
- an image sensing apparatus that captures images of one or more of the lights of a control light signal head;
- a processor in data communication with the image sensing apparatus and that receives the images generated by the light sensing apparatus and processes the images and generates an output; and
- a communication device in data communication with the processor and that generates and transmits a communication signal encoding the output generated by the processor;
- wherein each of the one or more signal head detectors is separate from the control light signal head and is configured to be attached to the control light signal head the signal head detector is monitoring, and is not in data communication with the control light signal head that the signal head detector is monitoring;

further comprising a server system in data communication each of the one or more signal head detectors, wherein the server system:
- receives, from each signal head detector, data that uniquely identifies each of the signal head detectors, and for each signal head detector, the images;
- maps each control light signal head to the unique identifier in mapping data;
- processes each compressed image to determine an activation status of each light depicted in each image; and
- determines, based on the activation status of each light depicted in each image over a time period, light pattern statistics of the control light signal heads for the time period.

16. The control light sensing system of claim 15, wherein the processor compresses the images to generate as output compressed images, and wherein:
the server system receives the images as compressed images, and processes the compressed images to determine an activation status of each light depicted in each image.

* * * * *